(12) United States Patent
Scannell (10) Patent No.: US 6,327,968 B1
(45) Date of Patent: Dec. 11, 2001

(54) SYSTEM AND METHOD FOR PRODUCING PAR-BAKED PIZZA CRUSTS

(75) Inventor: Stephen C. Scannell, Dallas, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 09/527,802

(22) Filed: Mar. 17, 2000

(51) Int. Cl.[7] .............................. A47J 43/18; A23P 1/10; A22C 7/00

(52) U.S. Cl. ........................ 99/353; 99/432; 99/439; 99/448; 99/DIG. 15; 426/468; 426/514

(58) Field of Search ...................... 99/432, 433, 439, 99/448, DIG. 15, 353, 349, 426; 425/394, 398; 220/4.26; 215/503, 504, 508; 426/505, 549, 293, 468, 514, 523

(56) References Cited

U.S. PATENT DOCUMENTS

| | | | |
|---|---|---|---|
| D. 343,627 | 1/1994 | Raio | D15/135 |
| 1,831,147 | * 11/1931 | Smith | 99/439 |
| 2,774,316 | 12/1956 | Daino . | |
| 3,347,181 | 10/1967 | Pizzo . | |
| 3,385,205 | * 5/1968 | McCloud | 99/439 |
| 3,814,005 | 6/1974 | Widdel | 99/349 |
| 3,949,660 | 4/1976 | Kuhlman | 99/352 |
| 4,046,920 | 9/1977 | Moline | 426/19 |
| 4,065,583 | 12/1977 | Ahlgren | 426/243 |
| 4,100,308 | 7/1978 | Gawrilow | 426/554 |
| 4,170,659 | 10/1979 | Totino et al. | 426/95 |
| 4,208,441 | 6/1980 | Westover | 426/293 |
| 4,251,549 | 2/1981 | Fournet et al. | 426/19 |
| 4,265,919 | 5/1981 | Munter et al. | 426/283 |
| 4,283,424 | 8/1981 | Manoski et al. | 426/94 |
| 4,285,979 | 8/1981 | Izzi | 426/94 |
| 4,303,677 | 12/1981 | De Acetis | 426/27 |
| 4,367,243 | 1/1983 | Brummett et al. | 426/303 |
| 4,379,055 | 4/1983 | Carlson et al. | 210/400 |
| 4,400,404 | 8/1983 | Persi | 426/549 |
| 4,464,405 | 8/1984 | De Christopher | 426/391 |
| 4,464,406 | 8/1984 | Pierick | 426/496 |
| 4,500,276 | 2/1985 | Cherkasky et al. | 425/297 |
| 4,539,213 | 9/1985 | Cherkasky et al. | 426/512 |
| 4,606,923 | 8/1986 | Ricke | 426/496 |
| 4,649,053 | 3/1987 | Lamonica | 426/302 |
| 4,656,935 | 4/1987 | Kukura | 99/426 |
| 4,661,361 | 4/1987 | Mongiello et al. | 426/283 |
| 4,668,524 | 5/1987 | Kirkpatrick | 426/502 |

(List continued on next page.)

FOREIGN PATENT DOCUMENTS

| | | | |
|---|---|---|---|
| 198 20 055 C1 | 11/1999 | (DE) | A21D/8/00 |
| 2 672 468-A1 | 8/1992 | (FR) | A21C/11/10 |
| 2 228 661 A | 9/1990 | (GB) . | |
| 2 289 431 A | 11/1995 | (GB) | A21B/3/13 |
| 45-104 | * 6/1970 | (JP) | 99/432 |

* cited by examiner

Primary Examiner—Reginald L. Alexander
(74) Attorney, Agent, or Firm—Baker Botts L.L.P.

(57) ABSTRACT

A system for producing par-baked pizza crusts includes a pan formed from a unitary sheet of metal. The pan includes a number of recesses stamped into the sheet of metal, each recess being adapted to receive a corresponding dough portion. The pan also includes a ledge formed around a perimeter of the pan. The system for producing par-baked pizza crusts further includes a lid assembly formed from a unitary sheet of metal for use in conjunction with the pan. The lid assembly includes a number of lids stamped into the sheet of metal, each lid corresponding to one of the recesses of the pan. The lid assembly also includes a ledge formed around a perimeter of the lid assembly. The ledge is formed such that when the lid assembly is placed over and in contact with the pan, the ledge of the lid assembly aligns with and rests on the ledge of the pan to enclose dough portions in an enclosed gap between the lid assembly and the pan.

27 Claims, 9 Drawing Sheets

U.S. PATENT DOCUMENTS

| | | | |
|---|---|---|---|
| 4,696,823 | 9/1987 | De Christopher | 426/496 |
| 4,713,942 | 12/1987 | Plattner | 118/25 |
| 4,749,581 | 6/1988 | Gorsuch et al. | 426/505 |
| 4,769,252 | 9/1988 | Escamilla | 426/496 |
| 4,842,882 * | 6/1989 | Paulucci | 426/439 |
| 4,904,492 | 2/1990 | Prigge | 426/523 |
| 4,905,581 | 3/1990 | Kirkpatrick | 99/353 |
| 4,910,038 | 3/1990 | Ducharme | 426/641 |
| 4,973,240 | 11/1990 | Reilly | 425/195 |
| 5,009,867 | 4/1991 | Kratochvil | 426/128 |
| 5,063,073 | 11/1991 | Kratochvil | 426/573 |
| 5,074,777 | 12/1991 | Garner | 425/289 |
| 5,074,778 | 12/1991 | Betts, Jr. et al. | 425/394 |
| 5,149,556 | 9/1992 | Le Viet et al. | 426/521 |
| 5,149,594 | 9/1992 | Lewandowski et al. | 426/503 |
| 5,154,115 | 10/1992 | Kian | 99/380 |
| 5,176,922 | 1/1993 | Balsano et al. | 425/89 |
| 5,200,216 | 4/1993 | Barz et al. | 426/36 |
| 5,200,225 | 4/1993 | Apaydin | 426/510 |
| 5,206,045 | 4/1993 | Stuck | 426/243 |
| 5,207,151 | 5/1993 | Le Viet et al. | 99/451 |
| 5,215,775 | 6/1993 | Hoffman, Jr. | 426/418 |
| 5,234,700 | 8/1993 | Barz et al. | 426/42 |
| 5,243,899 | 9/1993 | Moshier et al. | 99/450.1 |
| 5,253,565 | 10/1993 | Burton | 99/374 |
| 5,254,823 | 10/1993 | McKee et al. | 219/10.55 R |
| 5,256,432 | 10/1993 | McDonald et al. | 426/275 |
| 5,259,750 | 11/1993 | Lewandowski et al. | 425/298 |
| 5,260,070 | 11/1993 | Peleg | 426/94 |
| 5,308,640 | 5/1994 | Baer et al. | 426/611 |
| 5,354,566 | 10/1994 | Addesso et al. | 426/9 |
| 5,361,687 * | 11/1994 | DeVries | 99/426 |
| 5,380,543 | 1/1995 | Barz et al. | 426/582 |
| 5,400,698 * | 3/1995 | Savage | 99/439 |
| 5,405,626 | 4/1995 | Van Der Graaf et al. | 426/94 |
| 5,405,627 | 4/1995 | Ito | 426/94 |
| 5,409,367 | 4/1995 | Lewandowski et al. | 425/298 |
| 5,417,149 | 5/1995 | Raio et al. | 99/349 |
| 5,417,150 | 5/1995 | Kordic | 99/432 |
| 5,434,390 | 7/1995 | McKee et al. | 219/681 |
| 5,441,751 | 8/1995 | Vagani | 426/27 |
| 5,465,654 | 11/1995 | Lampi et al. | 99/422 |
| 5,484,618 | 1/1996 | Barz et al. | 426/304 |
| 5,508,049 | 4/1996 | Kordic | 426/94 |
| 5,510,135 | 4/1996 | Galder | 426/512 |
| 5,514,402 | 5/1996 | Williams | 426/496 |
| 5,526,735 | 6/1996 | Hacker et al. | 99/432 |
| 5,536,162 | 7/1996 | Juranovic et al. | 219/391 |
| 5,558,793 | 9/1996 | McKee et al. | 219/391 |
| 5,591,470 | 1/1997 | Bartley | 426/391 |
| 5,595,778 | 1/1997 | Huang et al. | 426/556 |
| 5,620,731 | 4/1997 | McKee | 426/505 |
| 5,622,742 | 4/1997 | Carollo | 426/279 |
| 5,716,658 | 2/1998 | Donnelly et al. | 426/420 |
| 5,750,170 | 5/1998 | Daouse et al. | 426/283 |
| 5,756,137 | 5/1998 | Viviano et al. | 426/94 |
| 5,775,208 | 7/1998 | Kimple | 99/422 |
| 5,780,082 | 7/1998 | Rebeaud | 426/94 |
| 5,789,009 | 8/1998 | Kordic et al. | 426/391 |
| 5,800,844 | 9/1998 | Raio et al. | 425/150 |
| 6,069,345 * | 5/2000 | Westerberg | 99/331 X |

SYSTEM AND METHOD FOR PRODUCING PAR-BAKED PIZZA CRUSTS

CROSS REFERENCE TO RELATED APPLICATIONS

This application is related to U.S. application Ser. No. 09/539,454 entitled "System and Method for Producing Par-Baked Pizza Crusts," filed Mar. 30, 2000 by Hanny Kanafani, et al.

TECHNICAL FIELD OF THE INVENTION

This invention relates to the field of pizza preparation and more particularly to a system and method for producing par-baked pizza crusts.

BACKGROUND OF THE INVENTION

Traditionally, pizzas have been made at restaurants by mixing dough ingredients, rolling and shaping the dough into a round disc, placing various toppings on the dough, and then baking the pizza to completion. However, in many restaurants, there is a need to produce pizza in a more timely fashion due to the high volume of pizza ordered and the customers' expectations of quick service. An alternate method that has been used to speed up the pizza-making process is to obtain frozen dough from a centralized source, thus eliminating the mixing step and reducing the time required to make the pizza in the restaurant.

Baking pizza crust dough from "scratch" or frozen dough requires a relatively long baking time. This is particularly true for certain specialty pizzas, such as deep-dish style pizzas. Furthermore, due to variances in the method by which the dough is formed, the resulting pizza crusts may have an inconsistent texture and taste. Moreover, when raw dough is made or when frozen dough is thawed, the dough must be used within a relatively short period of time.

SUMMARY OF THE INVENTION

Accordingly, a need has arisen for a type of pizza crust that may be pre-made and stored for a relatively long period of time. In addition, a need also exists for a method of partially cooking a pizza crust prior to a customer's order, so that the final cooking time after the order is received will be reduced. Moreover, a need has arisen for a process of baking a pizza crust that produces pizza crusts having a consistent form, texture, and taste. The present invention provides a system and method for producing par-baked pizza crusts that addresses shortcomings of prior systems and methods.

According to one embodiment of the invention, a system for producing par-baked pizza crusts includes a pan formed from a unitary sheet of metal. The pan includes a number of recesses stamped into the sheet of metal, each recess being adapted to receive a corresponding dough portion. The pan also includes a ledge formed around a perimeter of the pan. The system for producing par-baked pizza crusts further includes a lid assembly formed from a unitary sheet of metal for use in conjunction with the pan. The lid assembly includes a number of lids stamped into the sheet of metal, each lid corresponding to one of the recesses of the pan. The lid assembly also includes a ledge formed around a perimeter of the lid assembly. The ledge is formed such that when the lid assembly is placed over and in contact with the pan, the ledge of the lid assembly aligns with and rests on the ledge of the pan to enclose dough portions in an enclosed gap between the lid assembly and the pan.

Embodiments of the present invention provide numerous technical advantages. For example, par-baking a pizza crust according to one embodiment of the invention reduces the final cooking time that is required to cook a topped pizza crust. This advantage allows a restaurant serving pizzas to deliver its product more quickly to the consumer, and allows the restaurant to produce a higher quantity of pizzas. Furthermore, par-baking pizza crusts according to teachings of the present invention produces cost savings in equipment and labor due to the centralized production of the par-baked pizza crusts. Instead of each restaurant having to prepare and cook pizza crust dough from scratch, the dough can be prepared at a few central locations, par-baked at those locations, and then shipped to individual restaurants or consumers for later use. In addition, the present invention provides an automated system that enables the par-baked crusts to be mass-produced at these central locations.

Further advantages of the present invention include the ability to create pizza crusts that may be stored for longer periods of time than raw pizza dough, thus reducing the cost of wasted pizza dough. In addition, the use of a lid assembly incorporating teachings of the present invention in the par-baking process provides pizza crusts having a consistent and optimal form. The use of the lid assembly also provides an appropriate amount of heat transfer to and from the pizza crust and moisture retention in the pizza crust to give the pizza crust a consistent, pleasing texture and taste. Furthermore, the present invention provides a system and method that produce a par-baked pizza crust that, when cooked a final time with toppings, tastes similar to or better than a pizza cooked in one step from raw dough with toppings.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1A through 5 of the drawings, like numerals being used for like and corresponding parts of the various drawings.

Figure 1A:
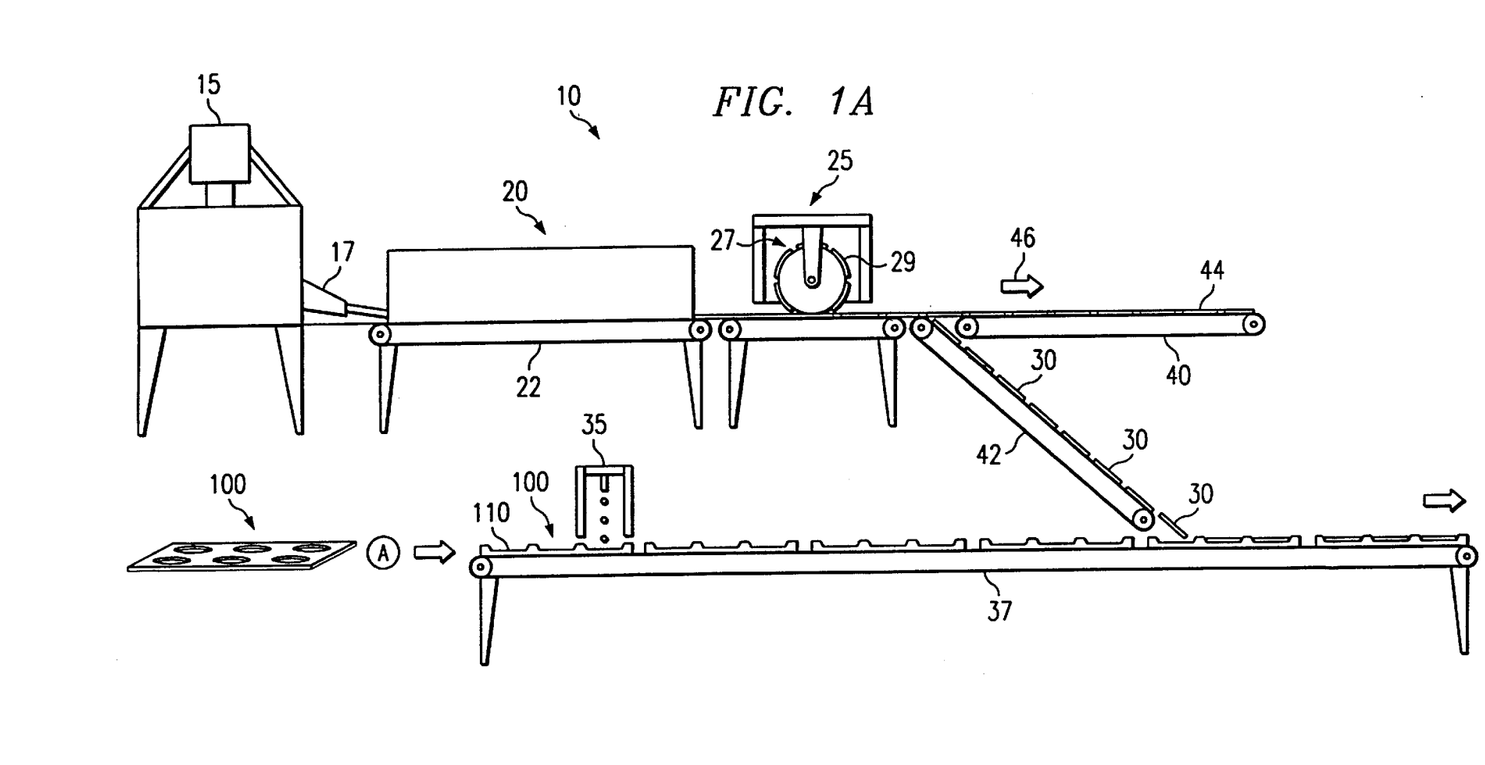
FIG. 1A is a schematic diagram showing a first portion of a system for producing par-baked pizza crusts according to teachings of the present invention.
Figure 1B:
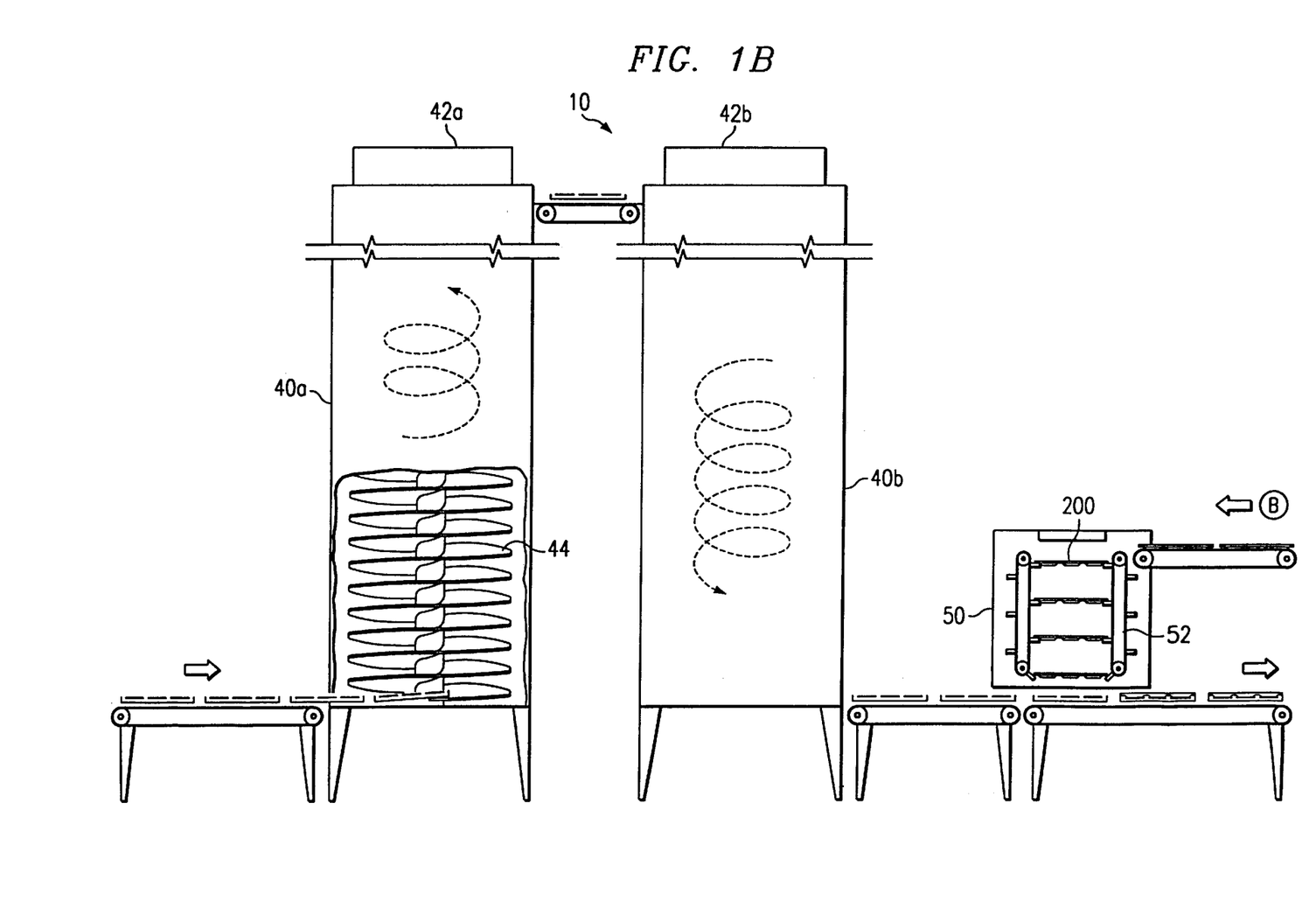
FIG. 1B is a schematic diagram showing a second portion of the system for producing par-baked pizza crusts.
Figure 1C:
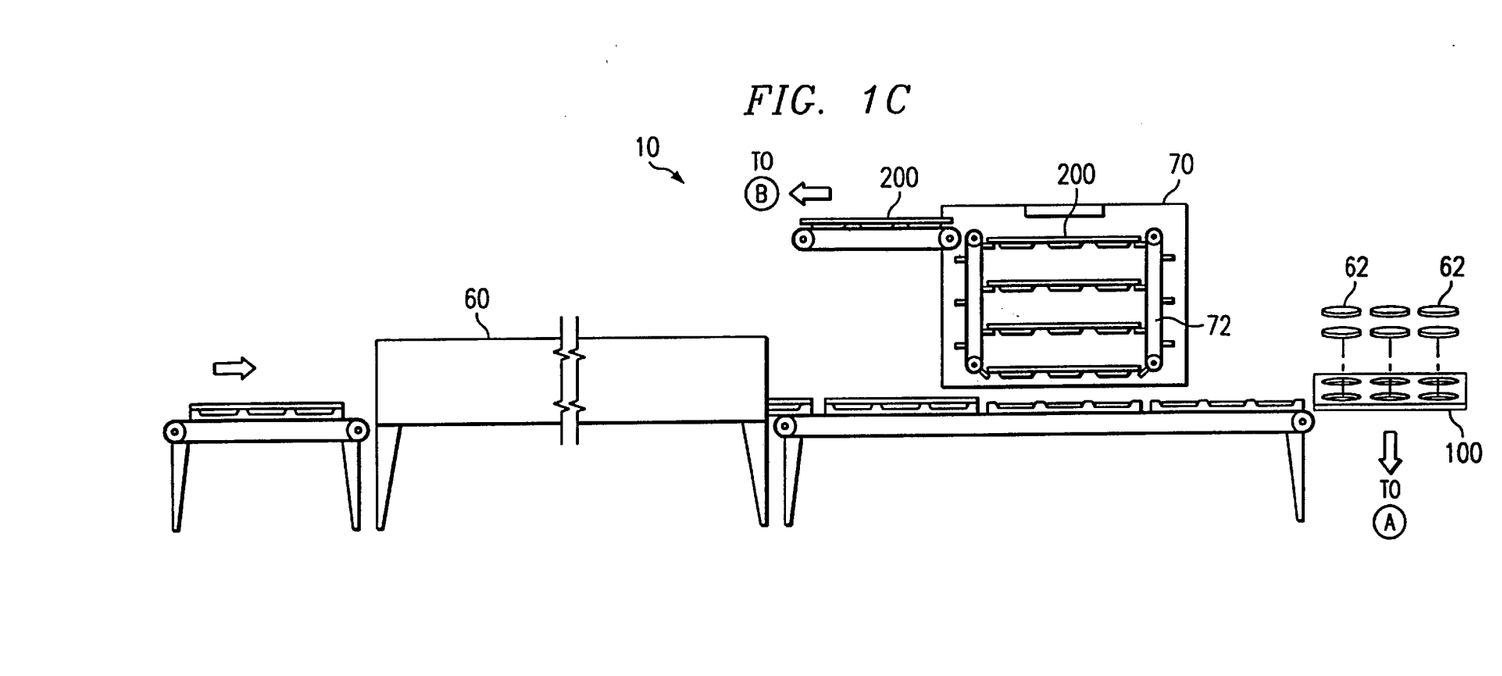
FIG. 1C is a schematic diagram showing a third portion of the system for producing par-baked pizza crusts.

FIGS. 1A–1C are schematic diagrams showing a system for producing par-baked pizza crust incorporating teachings of the present invention. Par-baking system 10 includes a number of different elements that operate together in an assembly line to increase the efficiency of the par-baking process. These elements are described below in conjunction with FIGS. 1A–1C.

FIG. 1A. shows the first section of system 10. The assembly line of system 10 starts with a mixer 15. The various ingredients used to make the pizza crust dough are inserted into mixer 15, and mixer 15 combines the ingredients to form dough. The dough exits mixer 15 through an extruder 17. The extruded dough then enters a sheeter 20. Sheeter 20 forms the extruded dough into a flat sheet. In a particular embodiment, sheeter 20 includes a number of rollers. The dough passes between or under these rollers, and the rollers form the extruded dough into a sheet having a desired thickness. Successive rollers may be used to increasingly thin the sheet of dough.

Alternatively, the dough may be placed in a tub or container after leaving mixer 15, so that the dough may be bulk-proofed. Bulk-proofing at this stage has certain advantages that will be described in detail below. The bulk-proofing may last from fifteen to sixty minutes, depending on the length of a subsequent proofing, described below in conjunction with FIG. 1B. Once the dough is bulk-proofed, it is then extruded into sheeter 20.

Once the dough leaves sheeter 20, it is conveyed to a cutter 25. Cutter 25 cuts dough portions 30 out of the sheet of dough. Dough portions 30 may have any desired shape, such as a circle, a square, a rectangle or an oval. In the illustrated embodiment, cutter 25 comprises a cutter drum 27 which has a series of cutting forms 29. Cutting forms 29 cut dough portions 30 out of the sheet of dough, much like a cookie cutter cuts cookies. As the sheet of dough moves through cutter 25, cutter drum 27 rotates over the dough, and cutting forms 29 cut dough portions 30 out of the dough sheet. Typically, there will be more than one cutting form 29 disposed around the circumference of cutter drum 27. In addition, there will typically be multiple cutting forms 29 disposed along the width of cutter drum 27. Although a particular embodiment has been described, it will be understood that system 10 may employ any suitable method of sheeting the dough and cutting pizza crust shapes out of the sheet of dough, such as a guillotine-type cutter. In addition, system 10 may include a mechanism that cuts the dough sheet into strips, and then separates these strips before they enter cutter 25. Because the strips are separated, cutting forms 29 may cut close to the edges of the strips, thus reducing the amount of dough left as webbing between the dough portions after cutting, but still leaving space between adjacently spaced dough portions.

Once the cut sheet of dough leaves cutter 25, a conveyor 40 pulls the sheet of dough over an opening leading to conveyor 42. As conveyor 40 pulls the sheet of dough over this opening, dough portions 30 fall into the opening and onto conveyor 42. Conveyor 40 pulls the remaining webbing 44 of the dough over the opening, and may return this webbing to an earlier point in system 10 for reuse, as indicated by arrow 46.

In a particular embodiment, a conveyer 37 moves a plurality of pans 100 under an oiler 35 that is located in a separate portion of system 10. As pans 100 (which are illustrated in cross-section) move under oiler 35, oiler 35 deposits a layer of oil in a plurality of recesses 110 located in each pan 100. This oil is later used to create a bottom fried surface on the par-baked pizza crusts. After being oiled, conveyor 37 moves pans 100 under conveyor 42, at which point dough portions 30 are each deposited into one of a plurality of recesses 110 located in pans 100. Alternatively, pans 100 may be conveyed under conveyor 42 without being oiled in this manner. In addition, a layer of oil may be applied to dough portions 30 after they are deposited in pans 100.

In system 10, the number of cutting forms 29 positioned along the width of cutter drum 27 (or the number of any other cutters used across the width of system 10) is equal to the number of recesses 110 located along the width of pans 100. The dimension referred to as width represents the dimension perpendicular to the plane of the page on which FIG. 1A is depicted. Similarly, the positioning between subsequent rows of dough portions 30 is equal to the spacing between subsequent rows of recesses 110 in pans 100. Therefore, there is a one-to-one correspondence of dough portions 30 that are cut and recesses 110 in which dough portions 30 are deposited.

Referring now to FIG. 1B, once conveyor 42 deposits dough portions 30 in pans 100, pans 100 are conveyed to a pair of proofers 40a and 40b. Environmental control units 42a and 42b control the temperature and humidity in proofers 40a and 40b, respectively. Environmental control units 42a and 42b condition the air inside proofers 40a and 40b to a temperature of approximately one hundred five degrees Fahrerheit and a humidity of approximately eighty-five percent. The conditions inside proofers 40a and 40b cause dough portions 30 in pans 100 to rise in preparation for par-baking.

In the illustrated embodiment, pans 100 containing dough portions 30 first enter proofer 40a. A lifting mechanism 44 conveys pans 100 from the bottom to the top of proofer 40a in a spiraling motion. Once pans 100 reach the top of proofer 40a, they are conveyed to proofer 40b. At this point, a lowering mechanism similar to lifting mechanism 44 conveys pans 100 from the top to the bottom of proofer 40b. Each pan 100 spends a total of approximately twenty to sixty minutes in proofers 40a and 40b. The total proofing time in proofers 40a and 40b depends on whether the dough was bulk-proofed after mixing.

In order to obtain a desired texture of the dough, the dough needs to be proofed for a selected period of time necessary to obtain that texture. The dough may be proofed for this selected period of time by bulk proofing, proofing in proofers 40a and 40b, or a combination of both. Thus, by initially bulk-proofing the dough, the total time required in proofers 40a and 40b is reduced. The less proofing time that is required in proofers 40a and 40b, the faster dough portions 30 can be run through proofers 40a and 40b. Therefore, through-put can be increased by using a bulk-proofing step. The length of proofing time required at each stage can vary greatly, but typical proofing times may include approximately forty-five minutes of bulk-proofing, and approximately thirty minutes of proofing in proofers 40a and 40b.

Furthermore, although a particular embodiment has been illustrated, it should be understood that system 10 contemplates that the number of proofers, the way in which pans 100 travel through proofers 40a and 40b, the conditions inside proofers 40a and 40b, and the proofing time may all be varied. For example, although two proofers 40a and 40b are illustrated, a single proofer 40 may also be used. In such a case, the height of proofer 40 might be increased to approximately equal the total height of proofers 40a and 40b, or the speed at which pans 100 travel through proofer 40 might be reduced. In addition, other styles of proofers may be used instead of spiral proofers 40 including, but not limited to, swing-tray, stacking and conveyorized proofers.

After leaving proofers 40, dough portions may optionally be prepared for the par-baking process, described below. Such preparation may include, but is not limited to, docking (inserting pins into dough portions 30 to minimize the entrapment of air during par-baking), post-proof cutting or scoring, stamping (e.g., to include a stuffing, such as cheese, inside the dough), and stretching.

Figure 2A:
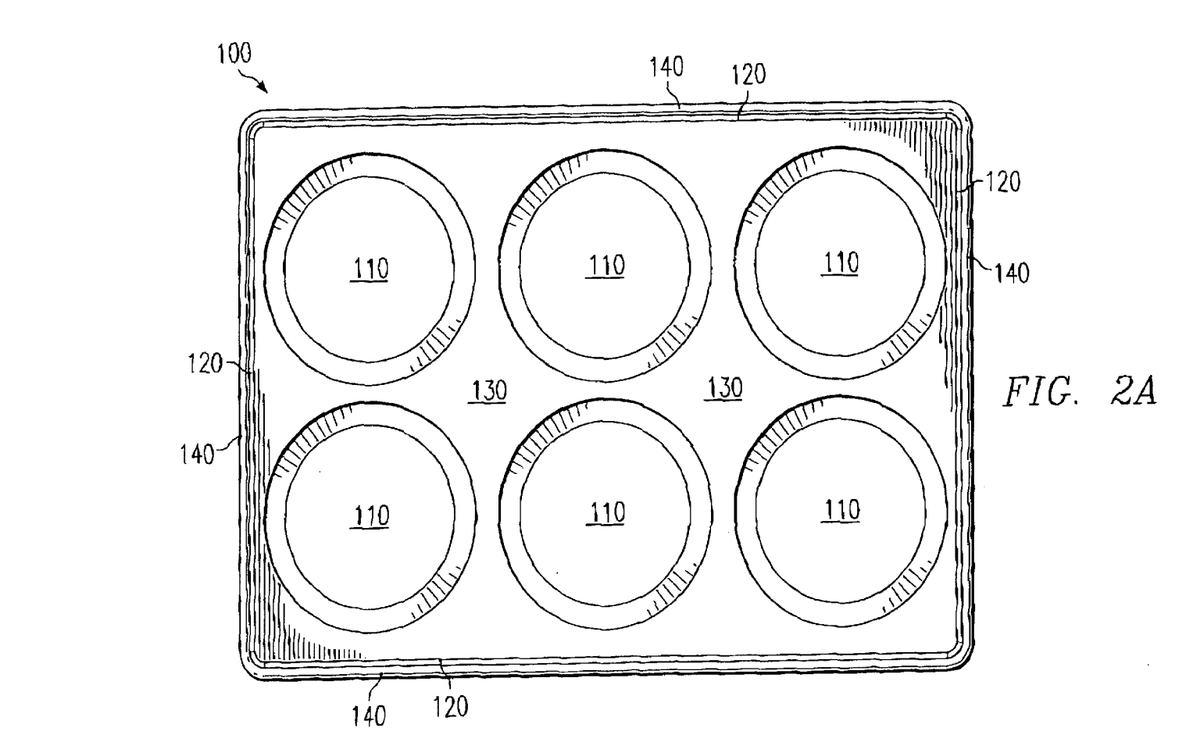
FIGS. 2A and 2B illustrate plan and elevation views, respectively, of a pan constructed according to teachings of the present invention.

Once each pan 100 leaves proofer 40b, it is conveyed to a lidding apparatus 50. In the illustrated embodiment, a plurality of lid assemblies 200 enter the top of lidding apparatus 50 arid are moved downward by a lowering mechanism 52. Simultaneously, pans 100 move under lowering mechanism 52 such that when an individual lid assembly 200 reaches the bottom of lowering mechanism 52, a pan 100 is positioned directly under and aligned with lid assembly 200. At this point, lowering mechanism 52 positions lid assembly 200 on top of corresponding pan 100. When lid assembly 200 is so positioned, a plurality of lids of lid assembly 200 are aligned with and rest on top of corresponding dough portions 30 positioned in recesses 110 of pan 100. The interaction of lid assemblies 200 and pans 100 is discussed in further detail in conjunction with FIG. 2. It will be understood that other suitable methods of positioning lid assemblies 200 on top of pans 100 may be used in conjunction with system 10. For example, the "lidding" step may be performed manually, instead of by a machine.

Referring now to FIG. 1C, after leaving lidding apparatus 50 pan 100, with lid assembly 200 and corresponding dough portions 30, is conveyed to an oven 60. Oven 60 par-bakes proofed dough portions 30. Par-baking is a process by which oven 60 partially bakes dough portions 30 to form par-baked pizza crusts. Oven 60 is maintained at temperature of approximately three hundred fifty to seven hundred degrees Fahrenheit, and dough portions 30 are par-baked in oven 60 for a period of approximately three to six minutes. Oven 60 may be a convection oven that includes air flows above and/or below dough portions. In one, embodiment an oven 60 is used that primarily has air flow or impingement against pans 100 and the bottom of dough portions 30 (or an oven 60 capable of air impingement from both the top and bottom of the oven is used but the top air impingement is shut off). This cooks the underside of dough portions 30 more thoroughly than the top side (which is in contact with lid assembly 200) and gives the underside a crispy texture. Furthermore, while dough portions 30 are in oven 60, the corresponding lids 210 of lid assembly 200 interact with dough portions 30 to provide several functions. These functions are described in conjunction with FIG. 5.

After pans 100 leave oven 60, they are conveyed to a delidding apparatus 70. Delidding apparatus 70 operates in a similar fashion to lidding of apparatus 50. A delidding mechanism 72 lifts lid assembly 200 off of pan 100, and moves lid assembly 200 to the top of delidding apparatus 70. At this point, a conveyor may transfer lid assembly 200 back to lidding apparatus 50 for reuse. It will be understood that any suitable method may be utilized in conjunction with system 10 for removing lid assemblies 200 from pans 100. For example, as with the lidding operation, the delidding function may be performed manually. In addition, magnets may be used to lift lid assemblies 200 (either manually or automatically).

After delidding mechanism 70 removes the lid assembly 200 from each pan 100, pans 100 leave delidding apparatus 70. At this point, par-baked pizza crusts 62 are removed from pan 100. Par-baked pizza crusts 62 may be removed from pans 100 using any appropriate method, including vacuum suction cup type de-panner. A conveyor may then transport each pan 100 back to oiler 35 to be re-oiled and used again in the par-baking process. Pans 100 and lid assemblies 200 may be cooled before reuse. After removal from pan 100, par-baked pizza crusts 62 are refrigerated or frozen, packaged, and shipped for use.

Figure 2B:
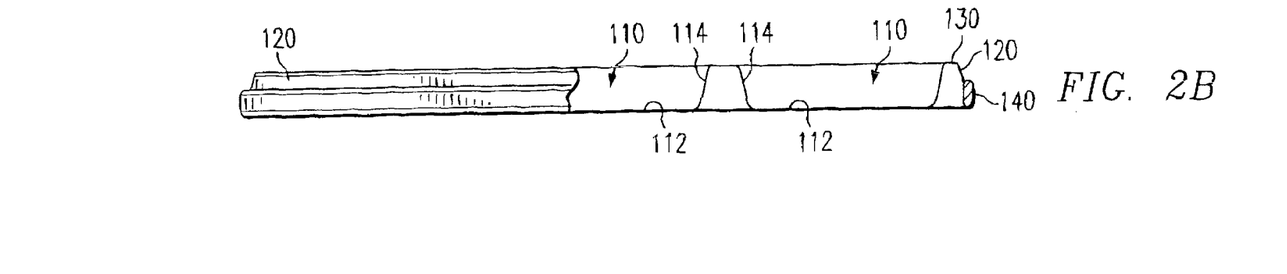
Figure 3A:
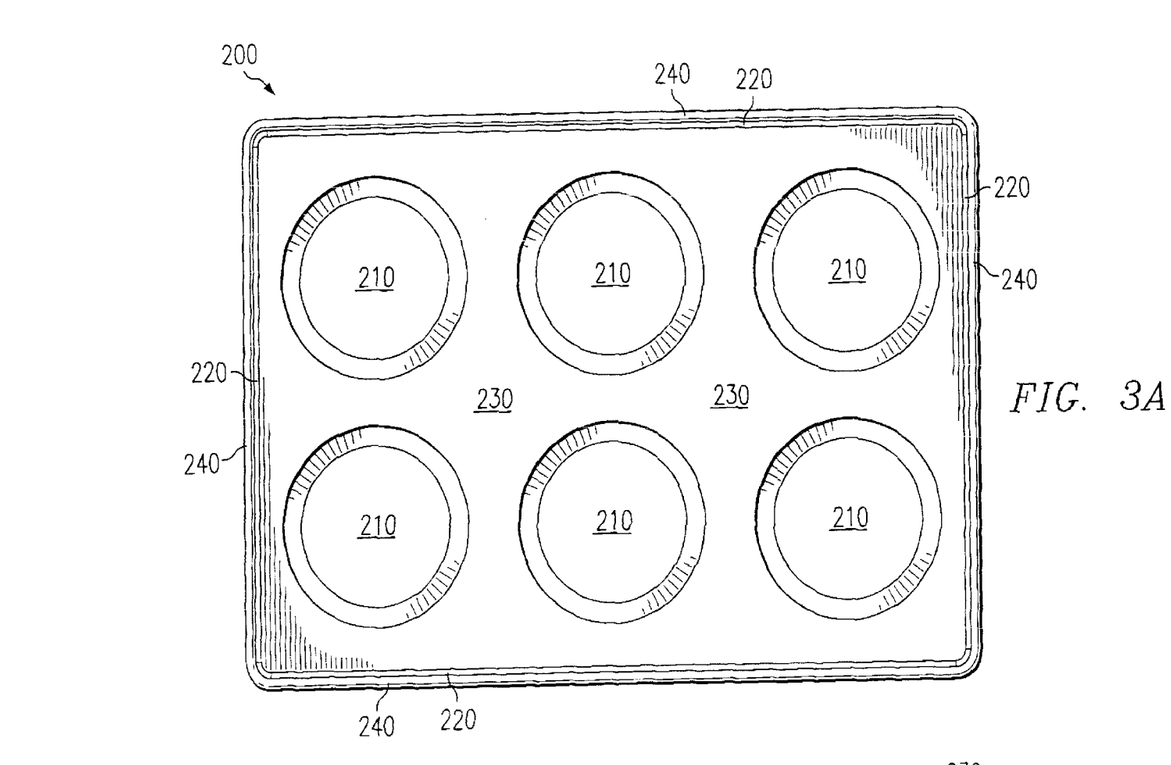
FIGS. 3A and 3B illustrate plan and elevation views, respectively, of a lid assembly constructed according to teachings of the present invention.
Figure 3B:
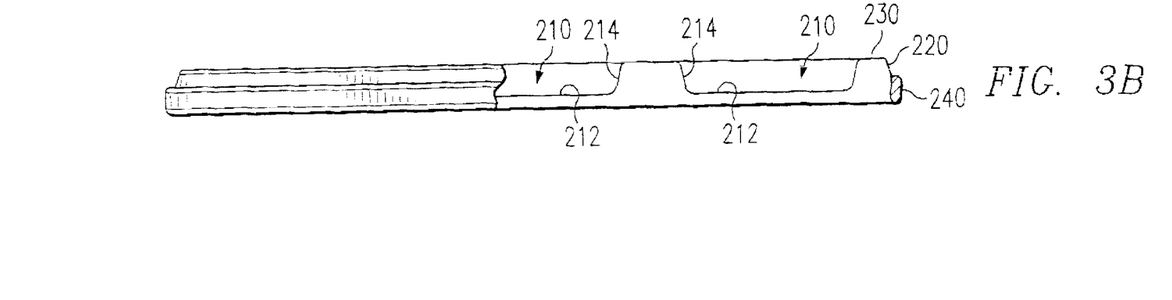
Figure 4:
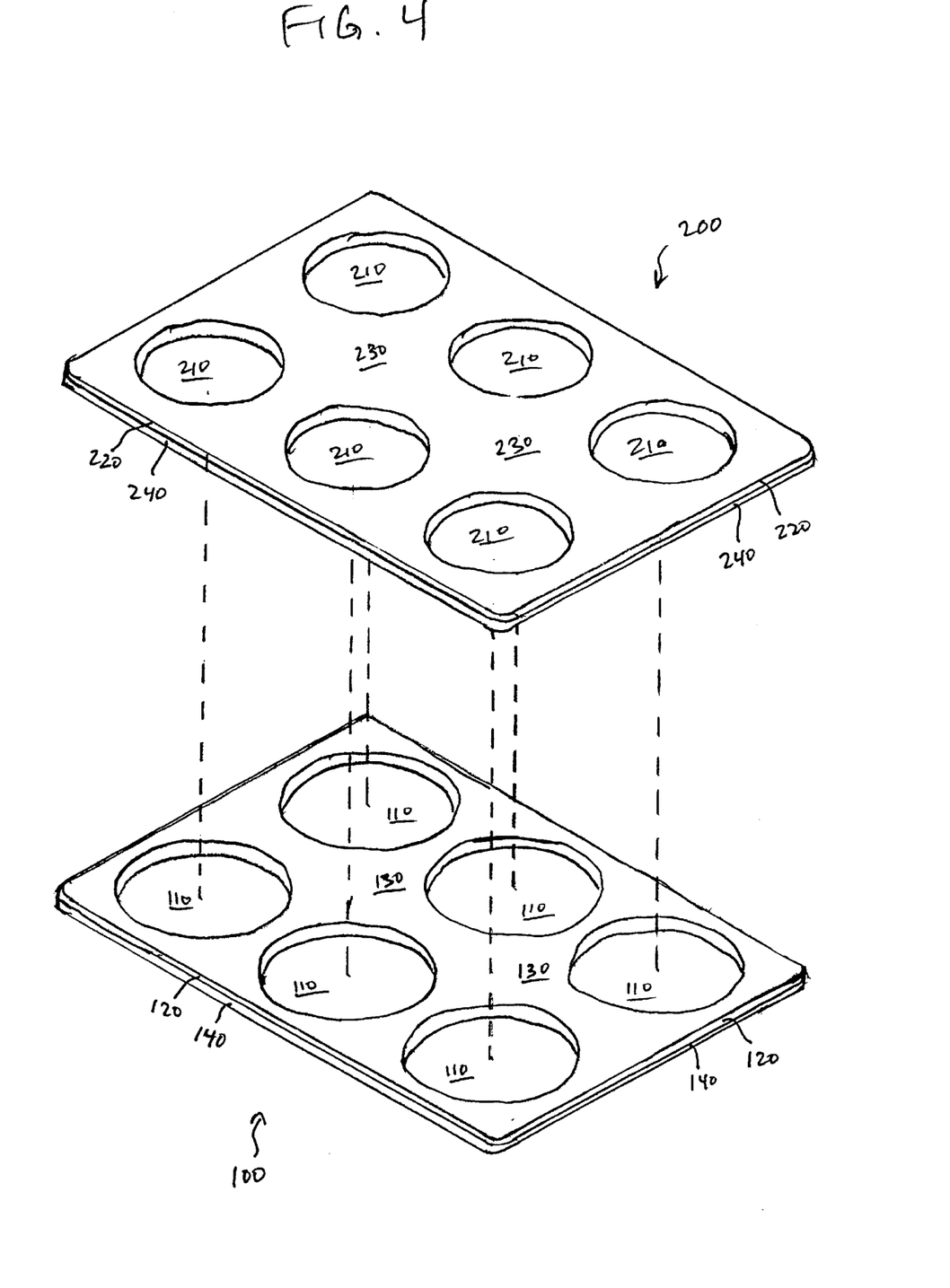
FIG. 4 is an isometric drawing of a lid assembly and a pan constructed according to teachings of the present invention.

FIGS. 2A and 2B illustrate plan and elevation views, respectively, of one embodiment of pan 100. FIGS. 3A and 3B illustrate plan and elevation views, respectively, of one embodiment of lid assembly 200. FIG. 4 illustrates an isometric view of another embodiment of pan 100 and corresponding lid assembly 200. Pan 100 includes a plurality of recesses 110 that correspond in shape to dough portions 30. Although pan 100 is shown in FIG. 2 with eight recesses 110, any number of recesses 110 may be used, as is illustrated in pan 100 of FIG. 4. The number of recesses 110 is only limited by the size and configuration of the various elements of the par-baking system in which pans 100 are used. For example, for use in system 10, the number of recesses 110 located across the width of pan 100 should equal the number of cutting forms 29 located across the width of cutter drum 27. Furthermore, the size of pan 100 is limited by the size of the elements of system 10, such as lidding apparatus 50, delidding apparatus 70, proofers 40a and 40b, and oven 60.

The shape of pan 100 may be rectangular, square, circular, or any other shape in which recesses 110 can be disposed. Pan 100 may be manufactured from a unitary piece of aluminum, with recesses 110 stamped into the aluminum. However, any other suitable baking materials may be used, such as other metals, ceramics or glass. In one embodiment, aluminum is used for its high thermal conductivity, which produces par-baked pizza crusts 62 that have a crispy underside. However, in alternate embodiments, pan 100 may not include recesses 110. Pan 100 may simply be a flat sheet upon which dough portions 30 are deposited.

Each recess 110 of pan 100 includes a generally flat central portion 112. Each recess 110 also includes a flange 114 that extends upwardly and outwardly from central portion 112. The functions of central portion 114 and flange 116 will be discussed below in conjunction with FIG. 5. Pan 100 also includes an angled side 120 formed between a top surface 130 of pan 100 and a ledge 140 formed around the perimeter of pan 100. Ledge 140 may be formed by rolling the edge of pan 100 against angled side 120. Furthermore, ledge 140 may be hollow and contain a reinforcing bar positioned around the perimeter of pan 100 to provide additional strength. The interaction of angled side 120 and ledge 140 with lid assembly 200 is described below.

Lid assembly 200 includes a plurality of lids 210 formed in a similar manner as recesses 110 of pan 100. Lid assembly 200 is constructed such that the number of lids 210 equals the number of recesses 110 in a corresponding pan 100. Furthermore, lids 210 are formed in lid assembly 200 such that when the perimeters of pan 100 and lid assembly 200 are aligned, each lid 210 is generally concentric, centered, and/or aligned with a corresponding recess 110. In the illustrated embodiment, lids 210 are smaller in diameter than recesses 110 such that a rim is formed around the perimeter of pizza crusts 62, as is described in further detail below.

As with recesses 110, each lid 210 of lid assembly 200 includes a generally flat central portion 212. Each lid 210 also includes a flange 214 that extends upwardly and outwardly from central portion 214. The functions of central portion 214, apertures 212 and flange 216 will be discussed below in conjunction with FIG. 5. Lid assembly 200 further includes an angled side 220 formed between a top surface 230 of lid assembly 200 and a ledge 240 formed around the perimeter of lid assembly 200. Ledge 240 may be formed by rolling the edge of lid assembly 200 against angled side 220. Furthermore, ledge 240 may be hollow and contain a reinforcing bar positioned around the perimeter of lid assembly to provide additional strength.

Lid assembly 200 may be made from stainless steel, however, any other suitable baking materials may be used, such as other metals, ceramics or glass. If lid assembly 200 is made of metal, lids 210 may be stamped or pressed into a unitary sheet of metal. In one embodiment, stainless steel is used for its low thermal conductivity relative to an aluminum pan 100. It is often desired that the top side of dough portions 30 be more moist and tender than the underside of dough portions 30. Since lid assembly 200 will typically contact the top side of dough portions 30 during par-baking, lid assembly 200 can therefore be made of a material with lower thermal conductivity than the aluminum pan 100 to provide this effect.

Figure 5:
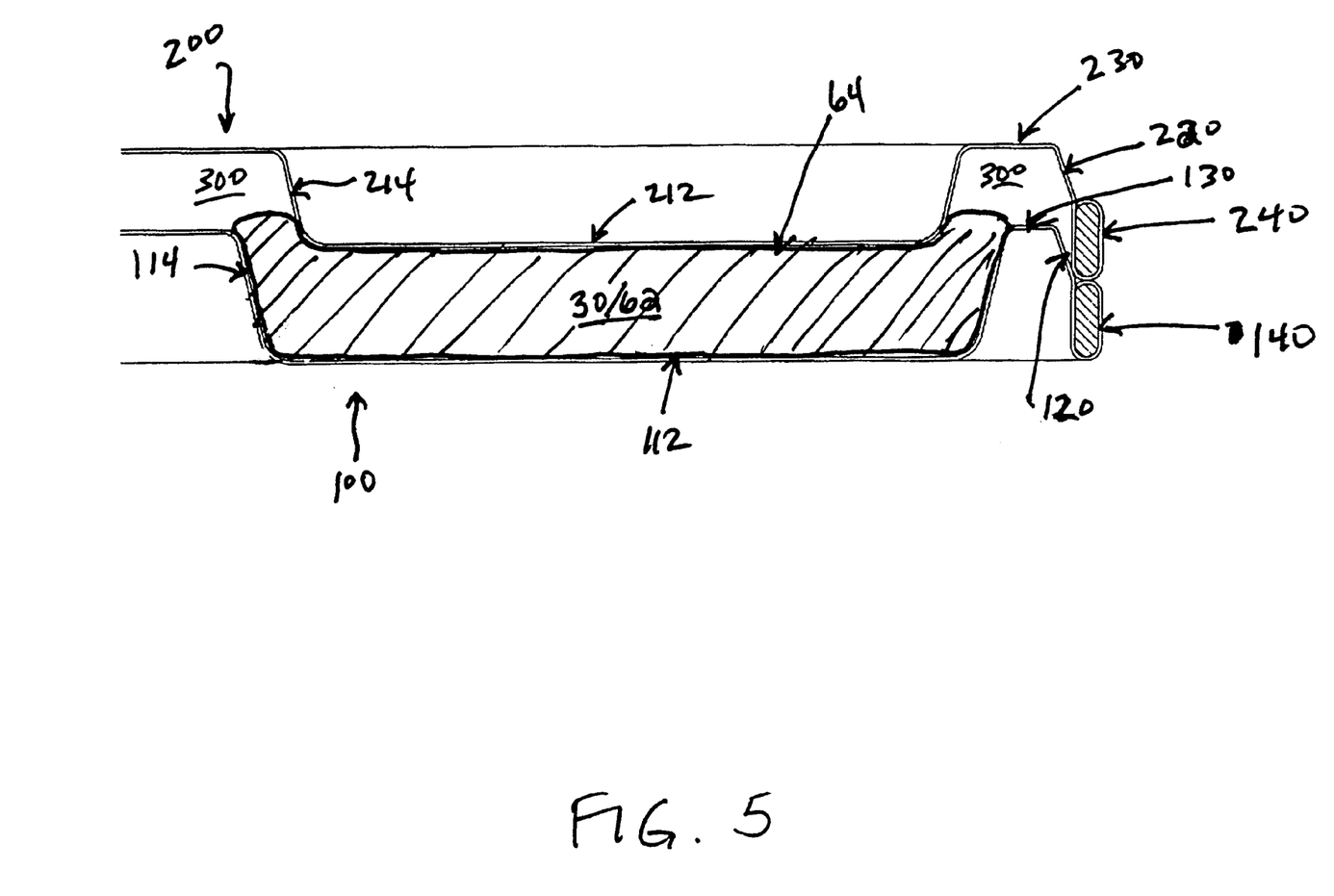
FIG. 5 is a schematic diagram in section with parts broken away showing a pizza dough portion positioned between a lid assembly and a pan according to teachings of the present invention.

FIG. 5 is a schematic diagram illustrating the configuration of a dough portion 30 as it is positioned between a recess 110 of pan 100 and a lid 210 of lid assembly 200 during par-baking in oven 60. Dough portion 30 is shown in the process of being par-baked into pizza crust 62. Lid assembly 200 is sized such that its perimeter is substantially equal in size to the perimeter of pan 100. Therefore, when lid assembly 200 is placed on top of pan 100, ledge 240 surrounding the perimeter of lid assembly 200 rests on top of ledge 140 of pan 100. Angled face 120 aids in placing lid assembly 200 on top of pan 100 by directing ledge 240 into contact with ledge 140 as lid assembly is placed in contact with pan 100. Due to the positioning of lids 210 in lid assembly 200, once the perimeters of pan 100 and lid assembly 220 are aligned, each lid 210 is centered over and concentric with a corresponding recess 110.

Lid assembly 200 performs several functions in forming pizza crust 62. First, lid assembly 200 forms dough portion 30 into the desired shape of pizza crust 62. Based on the relative vertical positions of central portion 212 of lid 210 and ledge 240, a gap 300 is defined between pan 100 and lid assembly 200 (including between recess 110 and lid 210) when lid assembly 200 is placed on top of pan 100. Dough portion 30 is located in gap 300. Dough portion 30 may not initially contact central portion 212 when lid assembly 200 is placed on pan 100. As dough portion 30 is par-baked in oven 60, dough portion 30 rises until it contacts central portion 212.

Due to the overall weight of lid assembly 200, lid 210 does not rise with dough portion 30. Instead, as dough portion 30 rises, central portion 212 forms a generally flat topping area 64 in the center of the par-baked pizza crust 62. Because the size of central portion 212 is smaller than the size of recess 110 that contains dough portion 30, central portion 212 forms a raised rim 66 around topping area 64 of dough portion 30. In addition, the slope of flange 214 helps to shape rim 66.

Figure 6:
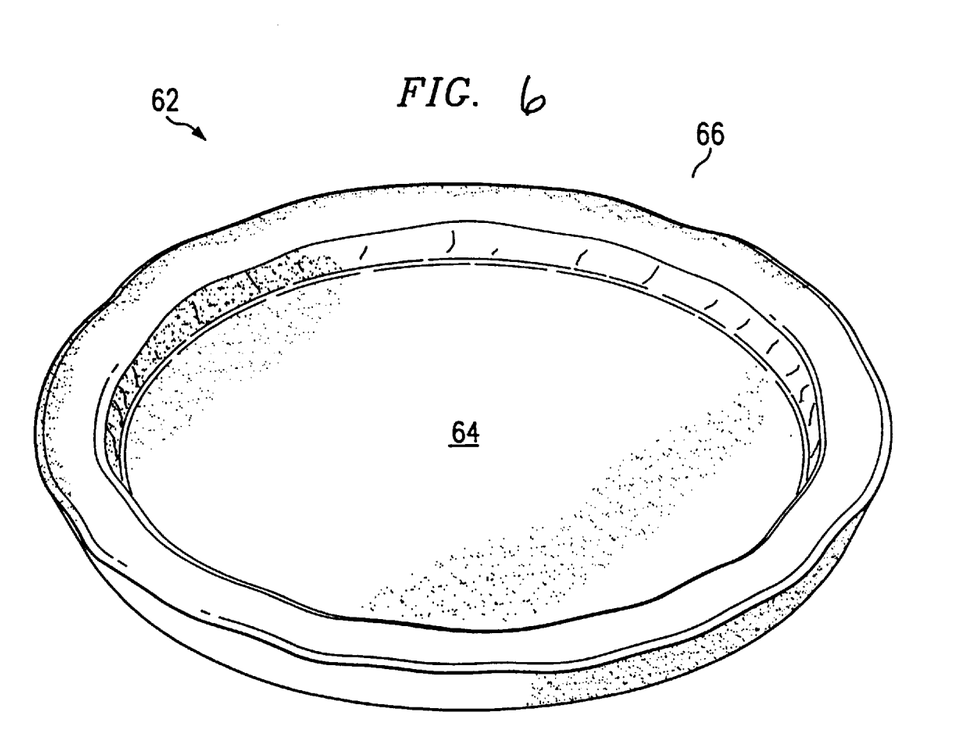
FIG. 6 is a schematic diagram showing a pizza crust par-baked according to teachings of the present invention.

FIG. 6 shows topping area 64 and rim 66 of pizza crust 62 after it has been par-baked in oven 60. The height of rim 66, as well as the thickness of topping area 64, may be varied by changing the relative vertical positions of central portion 212 and ledge 240 and/or the relative vertical spacing between central portion 212 and top surface 230 (the "depth" of lid 210).

Another function of lid 210 is to control the amount of heat and moisture transferred to and from dough portion 30. As described above, the material from which lid 210 is fabricated controls the amount of heat transfer to and from dough portion 30. As described above, an aluminum pan 100 may be used to provide pizza crusts 62 with a crispy underside, and a stainless steel (or other metal less conductive than aluminum) lid assembly 200 may be used to provide pizza crusts with a tender top side (the area where the toppings are later placed for final baking). Furthermore, providing air convection against pan 100, but not against lid assembly 200, oven 60 can also contribute to a crispy underside and a tender top side. In addition, the contact between ledges 140 and 240 around the perimeters of pan 100 and lid assembly 200 forms a moisture seal between pan 100 and lid assembly 200 and encloses gap 300. Due to this seal, moisture is substantially prevented from escaping from enclosed gap 300 formed between pan 100 and lid assembly 200. This moisture retention aids in the par-baking of dough portion 30 and prevents dough portion 30 from losing excessive moisture. Some moisture and gases may be allowed to escape from enclosed gap 300 to prevent a pressure build-up in enclosed gap 300. In addition, one or more apertures or perforations may be formed in lid 210 and/or recess 110 to allow excess gases or moisture to escape.

Figure 7:
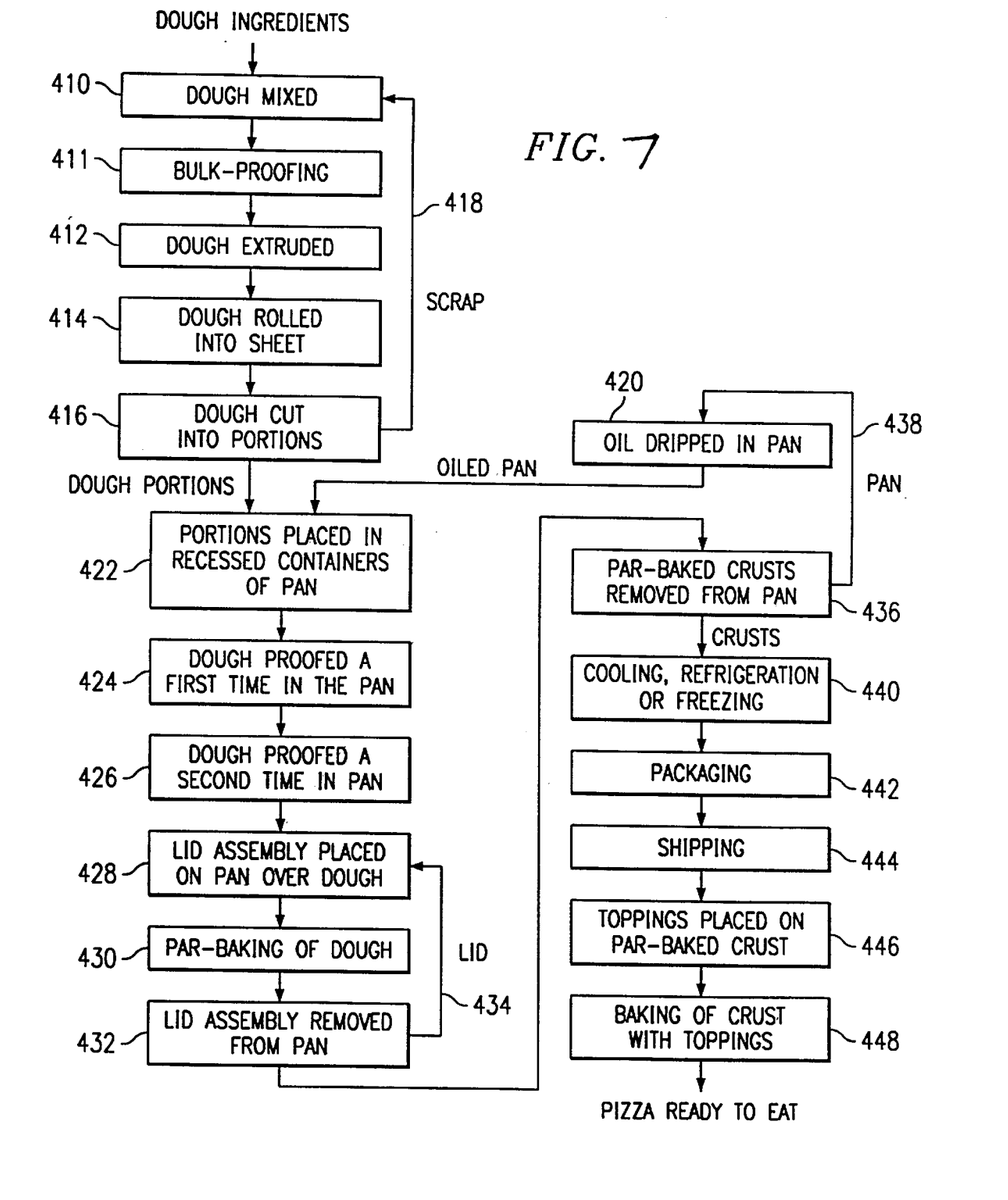
FIG. 7 is a flow chart illustrating a method of par-baking a pizza crust according to teachings of the present invention.

FIG. 7 is a flow chart illustrating a method of par-baking pizza crusts. The method begins at a step 410 where dough ingredients are placed into mixer 15 and combined to form pizza dough. The dough is then extruded from mixer 15 at step 412, and sheeter 20 rolls the dough into a sheet at step 414. Next, cutter 25 cuts dough portions 30 out of the dough sheets at step 416. A conveyor 40 returns dough webbing 44 to mixer 15 for reuse at step 418.

An oiler 35 deposits a layer of oil into the bottom of recesses 110 in pan 100 at step 420. Conveyer 42 deposits cut dough portions 30 into recesses 110 of pan 100 at step 422. A second oiler may optionally spray oil on dough portions 30 after dough portions 30 are deposited into recesses 110. Pan 100 containing dough portions 30 then enters proofer 40a, which proofs dough portions 30 a first time at step 424. This process may be repeated in proofer 40b at step 426. Once proofers 40a and 40b have proofed dough portions 30, lidding apparatus 50 places lid assembly 200 over pan 100 and dough portions 30 at step 428. Lidding apparatus 50 positions lid assembly 200 such that each lid 210 is in contact with a corresponding dough portion 30. Pan 100 and its lid assembly 200 then enter oven 60, and oven 60 par-bakes dough portions 30 at step 430.

After oven 60 par-bakes dough portions 30 to produce par-baked pizza crusts 62, and pan 100 has exited oven 60, delidding apparatus 70 removes lid assembly 200 from pan 100 at step 432. A conveyor returns lid assembly 200 to lidding apparatus 50 for reuse at step 434. Par-baked pizza crusts 62 are removed from pan 100 at step 436, and a conveyor returns pan 100 to oiler 35 for reuse at step 438.

Par-baked crusts 62 are cooled to room temperature, refrigerated, or frozen at step 440. Freezing may be accomplished by placing crusts 62 in a spiral freezer. A preservative may be sprayed on crusts 62 before or after step 440 to allow for longer storage. The cooled or frozen crusts 62 are packaged individually or in groups, as needed, at step 442. Packaged pizza crusts 62 are shipped to an end user at step 444. Typically, this end user will be a restaurant that serves pizzas, however, the end user may be an individual consumer. The end user removes pizza crust 62 from the packaging, and places one or more toppings on crust 62 at step 446. The end user bakes par-baked pizza crust 62 with the toppings to form a completed pizza that is ready to eat at step 448. Because oven 60 par-bakes pizza crust 62 at step 430, the duration of the baking time at step 448 is decreased from that of the traditional baking time of a pizza baked in one step. Furthermore, par-baking pizza crusts 62 produces cost savings in equipment and labor due to the centralized and automated nature of system 10. Moreover, the placement of lid assembly 200 over dough portions 30 in oven 60, produces crusts 62 that have a consistent and optimal form, texture, and taste.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for producing par-baked pizza crusts, comprising:
   a pan formed from a unitary sheet of metal and comprising:
      a plurality of recesses stamped into the sheet of metal, each recess adapted to receive a corresponding dough portion; and
      a ledge formed around a perimeter of the pan; and
   a lid assembly formed from a unitary sheet of metal for use in conjunction with the pan, the lid assembly comprising:
      a plurality of lids stamped into the sheet of metal, each lid corresponding to one of the recesses of the pan and each lid having a generally flat central portion;
      a ledge formed around a perimeter of the lid assembly such that when the lid assembly is placed over and in contact with the pan, the ledge of the lid assembly aligns with and rests on the ledge of the pan to enclose dough portions in an enclosed gap between the lid assembly and the pan, wherein the ledge of the lid assembly and the ledge of the pan being formed to align in a manner such that moisture in the dough portions is at least partially prevented from escaping from the enclosed gap between the lid assembly and the pan; and
      the lid assembly being of sufficient weight such that the lids compress the dough portions as the dough portions rise and such that the central portion of the lids forms a topping area in the dough portions.

2. The system of claim 1, wherein the lid assembly is comprised of a metal having a lower thermal conductivity than the metal comprising the pan.

3. The system of claim 1, wherein the lid assembly is comprised of stainless steel.

4. The system of claim 1, wherein the pan is comprised of aluminum.

5. The system of claim 1, wherein the central portion of each lid is smaller than the dough portion in the corresponding recess such that a raised rim is formed around the dough portion.

6. The system of claim 5, wherein each lid further comprises a flange extending upwardly and outwardly from the central portion.

7. The system of claim 1, wherein:
   the perimeters of the pan and the lid assembly are generally rectangular; and
   the lids and recesses are generally circular.

8. The system of claim 1, wherein the pan further comprises an angled face formed around the perimeter of the pan, the angled face operable to direct alignment of the ledge of the lid assembly with the ledge of the pan.

9. The system of claim 1, wherein each lid is formed in the lid assembly such that the lid is aligned with a corresponding recess in the pan when the ledges of the pan and the lid assembly are aligned.

10. The system of claim 1, wherein:
    the pan further comprises a reinforcing bar included in the ledge; and
    the lid assembly further comprises a reinforcing bar included in the ledge.

11. The system of claim 1, wherein the lids of the lid assembly include apertures formed in the lids.

12. A system for producing par-baked pizza crusts, comprising:
    a mixer operable to mix a plurality of ingredients to produce pizza crust dough;
    a cutter operable to cut a plurality of dough portions from the dough;
    a pan adapted to support the dough portions, the pan formed from a sheet of metal and comprising:
       a plurality of recesses stamped into the sheet of metal, each recess adapted to receive a corresponding dough portion; and
       a ledge formed around a perimeter of the pan;
    a proofer through which the pan travels to proof the dough portions;
    a lid assembly positioned over the dough portions after the pan exits the proofer, the lid assembly formed from a sheet of metal for use in conjunction with the pan, the lid assembly comprising:
       a plurality of lids stamped into the sheet of metal, each lid corresponding to one of the recesses of the pan; and
       a ledge formed around a perimeter of the lid assembly such that when the lid assembly is placed over and in contact with the pan, the ledge of the lid assembly aligns with and rests on the ledge of the pan to enclose dough portions in an enclosed gap between the lid assembly and the pan; and
    a par-baking oven operable to par-bake the dough portions while the lid assembly is positioned over the dough portions to produce par-baked pizza crusts.

13. The system of claim 12, wherein the par-baking oven is further operable to direct an air flow against the pan to provide convective baking of the dough portions.

14. The system of claim 12, further comprising an oiler operable to deposit a layer of oil in the bottom of each recess of the pan before the dough portions are received in the recesses, the layer of oil contributing to the production of a bottom fried surface of the par-baked pizza crusts.

15. The system of claim 12, further comprising an oiler operable to deposit a layer of oil on top of the dough portions after the dough portions are received in the recesses.

16. The system of claim 12, further comprising a lidding apparatus operable to position the lid assembly over the dough portions.

17. The system of claim 12, further comprising a delidding apparatus operable to remove the lid assembly from over the dough portions.

18. The system of claim 12, further comprising:
    a first conveyor operable to convey the lid assembly for reuse after the dough portions have been par-baked; and a second conveyor operable to convey the pan for reuse after the dough portions have been par-baked.

19. The system of claim 12, further comprising a baking oven located remotely from the par-baking oven, the baking oven operable to produce a pizza for consumption by baking a par-baked pizza crust having a pizza topping.

20. A system for producing par-baked pizza crusts, comprising:
a pan adapted to support a plurality of dough portions, the pan formed from a sheet of metal and comprising:
a plurality of recesses stamped into the sheet of metal, each recess adapted to receive a corresponding dough portion; and
a ledge formed around a perimeter of the pan;
a lid assembly formed from a sheet of metal for use in conjunction with the pan, the lid assembly comprising:
a plurality of lids stamped into the sheet of metal, each lid corresponding to one of the recesses of the pan; and
a ledge formed around a perimeter of the lid assembly such that when the lid assembly is placed over and in contact with the pan, the ledge of the lid assembly aligns with and rests on the ledge of the pan to enclose dough portions in an enclosed gap between the lid assembly and the pan, wherein the ledge of the lid assembly and the ledge of the pan being formed to align in a manner such that moisture in the dough portions is at least partially prevented from escaping from the enclosed gap between the lid assembly and the pan; and
an oven operable to par-bake the dough portions while the lid assembly is positioned over the dough portions to produce par-baked pizza crusts.

21. A method for producing par-baked pizza crusts, comprising:
mixing a plurality of ingredients to produce pizza crust dough;
cutting a plurality of dough portions from the dough;
depositing the dough portions in a pan, the pan formed from a sheet of metal and comprising:
a plurality of recesses stamped into the sheet of metal, each recess adapted to receive a corresponding dough portion; and
a ledge formed around a perimeter of the pan;
proofing the dough portions;
positioning a lid assembly over the proofed dough portions, the lid assembly formed from a sheet of metal for use in conjunction with the pan, the lid assembly comprising:
a plurality of lids stamped into the sheet of metal, each lid corresponding to one of the recesses of the pan; and
a ledge formed around a perimeter of the lid assembly such that when the lid assembly is placed over and in contact with the pan, the ledge of the lid assembly aligns with and rests on the ledge of the pan to enclose dough portions in an enclosed gap between the lid assembly and the pan; and
par-baking the dough portions in a par-baking oven while the lid assembly is positioned over the dough portions to produce par-baked pizza crusts.

22. The method of claim 21, wherein:
depositing the dough portions on the pan comprises depositing each dough portion into a corresponding recess in the pan; and
the method further comprises depositing a layer of oil in the bottom of each recess of the pan before depositing the dough portions in the recesses, the layer of oil contributing to the production of a bottom fried surface of the par-baked pizza crusts.

23. The method of claim 21, further comprising depositing a layer of oil on top of the dough portions after the dough portions are deposited in the pan.

24. The method of claim 21, further comprising:
removing the lid assembly after par-baking; and
removing the par-baked pizza crusts from the pan.

25. The method of claim 24, further comprising:
recirculating the pan after the par-baked pizza crusts have been removed from the pan such that additional dough portions may be positioned in the pan for proofing and par-baking; and
recirculating the lid assembly after the lid assembly has been removed such that the lid assembly may be repositioned over additional proofed dough portions.

26. The method of claim 21, further comprising:
topping the par-baked pizza crusts with a pizza topping; and
baking the topped pizza crusts in a baking oven located remotely from the par-baking oven to produce pizzas for consumption.

27. A method for producing par-baked pizza crusts, comprising:
positioning a plurality of dough portions on a pan, the pan formed from a sheet of metal and comprising:
a plurality of recesses stamped into the sheet of metal, each recess adapted to receive a corresponding dough portion; and
a ledge formed around a perimeter of the pan;
positioning a lid assembly over the dough portions, the lid assembly formed from a sheet of metal for use in conjunction with the pan, the lid assembly comprising:
a plurality of lids stamped into the sheet of metal, each lid corresponding to one of the recesses of the pan; and
a ledge formed around a perimeter of the lid assembly such that when the lid assembly is placed over and in contact with the pan, the ledge of the lid assembly aligns with and rests on the ledge of the pan to enclose dough portions in an enclosed gap between the lid assembly and the pan, wherein the ledge of the lid assembly and the ledge of the pan are formed to align in a manner such that moisture in the dough portions is at least partially prevented from escaping from the enclosed gap between the lid assembly and the pan; and
par-baking the dough portions in an oven while the lid assembly is positioned over the dough portions to produce par-baked pizza crusts.

* * * * *